Jan. 29, 1924.  1,482,106
C. W. AVERY ET AL
GLASS MACHINERY
Filed Feb. 4, 1922    2 Sheets-Sheet 2

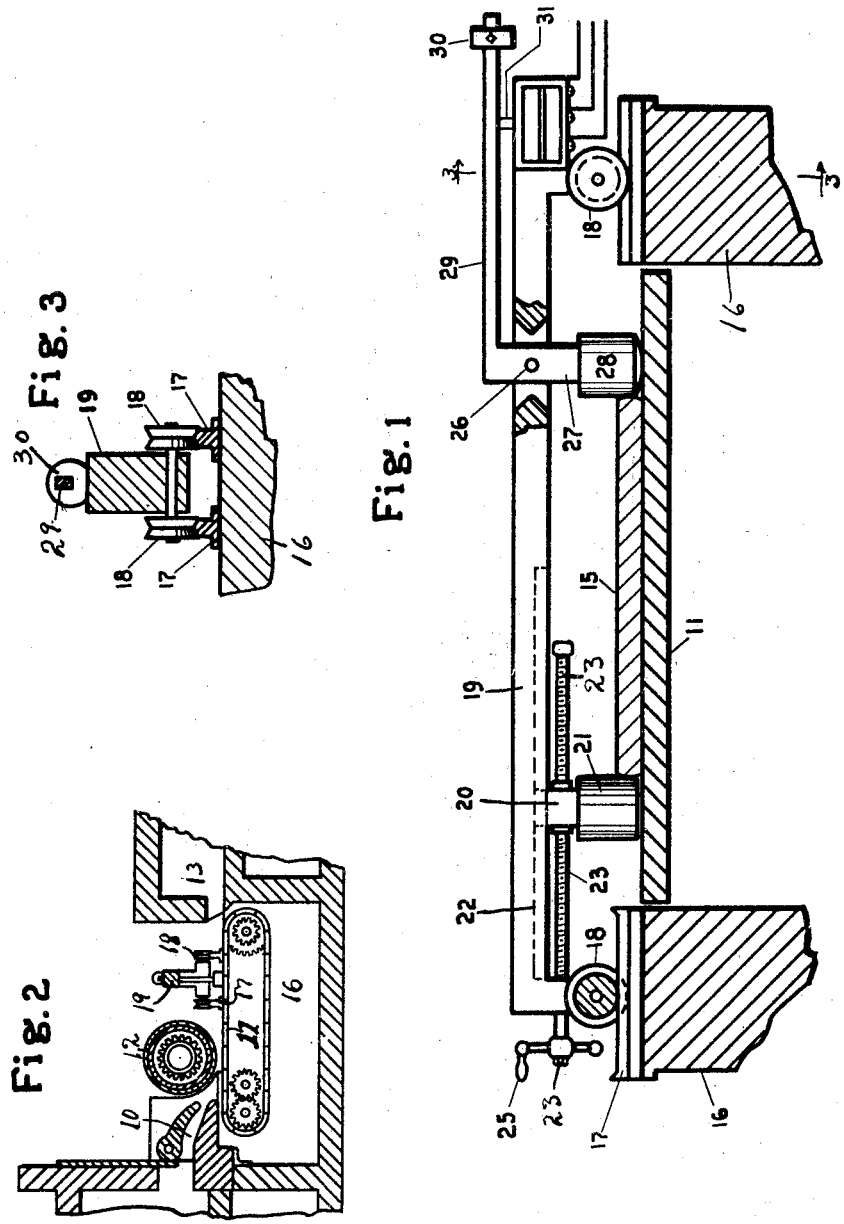

Fig. 4

WITNESS:
J. M. Cahill.

INVENTOR.
C. W. Avery
W. L. Vesey
E. L. Davis
BY
ATTORNEY.

Patented Jan. 29, 1924.

1,482,106

UNITED STATES PATENT OFFICE.

CLARENCE W. AVERY AND WENZEL G. VESEY, OF DETROIT, MICHIGAN, ASSIGNORS TO FORD MOTOR COMPANY, OF DETROIT, MICHIGAN, A CORPORATION OF DELAWARE.

GLASS MACHINERY.

Application filed February 4, 1922. Serial No. 534,034.

*To all whom it may concern:*

Be it known that we, CLARENCE W. AVERY and WENZEL G. VESEY, citizens of the United States, residing at Detroit, in the county of Wayne and State of Michigan, have invented new and useful Improvements in Glass Machinery, of which the following is a specification.

The object of our invention is to provide new and useful machinery for the manufacture of glass, of simple, durable, and inexpensive construction.

In connection with our invention it is first necessary to explain somewhat the problem which has been solved as it is of a somewhat unusual nature. In connection with a certain method of manufacturing glass and a machine by which that method is practised, glass is produced in a continuous strip by flowing it from a melting tank, rolling it to shape, passing it thru a leer to temper, and then cutting the glass into pieces adapted for such further operations as may be necessary. In connection with the forming of the strip, it will be understood that a glass tank of any ordinary form is provided with a spout having controlling gates therein to permit glass to flow continuously therefrom in predetermined quantities on to an endless conveyor and that the glass thus received by the conveyor is passed beneath the roller and thence into a leer. It will be understood that the glass flowing on the conveyor is practically molten and that it becomes plastic by the time it passes beneath the roller and then becomes hard before it leaves the conveyor to pass into the leer.

Heretofore substantial difficulties have been met in the practise of this process of forming glass continuously, in that the strip formed was not of uniform width so that the trimming of the glass strip on at least one edge was always necessary, and the irregularities in the width of the glass made the cutting of the glass to shape more difficult. Further irregularities in the width of the glass so manufactured, add materially to the expense of producing the glass due to the additional waste of material caused by such irregularities. It may be mentioned in this connection that the glass for which this system of manufacture is used, is of the heavy plate glass type so that the material cost thereof is important.

A further advantage of being able to run this strip of glass so that it will be of uniform width is in connection with the making of glass pieces of uniform width where a large number of such pieces are required. As for instance, in connection with the making of an automobile windshield. It will be understood that if a strip of glass were formed on a conveyor then that this strip might be regulated to run to the exact total width of the two parts of an automobile windshield, and then that the strip might be divided centrally to form the two halves of the windshield. By this method it will be seen that windshield glass, for instance, could be produced so that it would require a minimum amount of cutting and so that there would be substantially no waste due to the trimming of the glass.

With the foregoing explanation in mind of the problem to be solved, it will be understood that the object of our invention is to provide a regulator for the width of continuously produced strips adapted to function automatically to keep the resulting strip of uniform cross-section.

A further object of our invention is to provide such a width regulator with suitable contact arms which will follow the edges of the strip produced so that variations in width of the strip may move these contact arms to actuate mechanism for correcting any tendency toward irregularities.

A further object of our invention is to produce such a regulator with means connected to the driving power of the conveyor for varying the speed of the conveyor so that the latter may vary its operating speed relative to the amount of glass supplied thereto, thereby increasing or diminishing proportionately the width of the strip produced on the conveyor.

A further object of our invention is to provide electrical connections between the contact arms mentioned and the electrical driving connections for the conveyor whereby the speed of the driving motors may be increased or decreased as may be necessary.

With these and other objects in view, our invention consists in the arrangement, combination, and construction of the various parts of our improved device, as described in the specification, claimed in our claims and shown in the accompanying drawings, in which:

Figure 1 shows a side elevation of our improved device, parts being shown in section to better illustrate the construction and the glass forming mechanism associated therewith being shown in transverse section.

Figure 2 shows a vertical section of the glass forming mechanism having our improved regulator installed thereon.

Figure 3 shows a vertical sectional view on the line 3—3 of Figure 1, and

Figure 4 illustrates one form of electrical connections and circuits for use in connection with our improved device.

Referring to the accompanying drawings, we have used the reference numeral 10 to indicate, generally, the spout of a glass tank, and numeral 11 to indicate the conveyor receiving the glass flowing from the spout 10 and carrying it beneath the roller 12 which is driven at the same peripheral speed as the conveyor 11. The glass strip 15 thus formed on the conveyor 11 proceeds into the leer 13 where it is tempered. The cutting, trimming, and other parts of the device for a complete system of making glass are not here illustrated, as our invention consists simply in the attachment of a width regulator to the parts here shown.

At either side of the conveyor 11 and just past or beyond the roller 12, supports 16 carry spaced tracks 17 on which we have mounted rollers 18 which carry a transverse frame member 19. This frame member 19 is the main frame of our width regulator and it will be understood that the wheels 18 and track 17 permit the frame to travel in a direction transverse to the movement of the glass 15 on the conveyor 11 so that if the position of the strip 15 varies on the conveyor then our width regulating device will also vary its position correspondingly. Depending from the frame member 19 adjacent to one end thereof is a lug 20 upon which is mounted a contact roller 21 designed to contact with the edge of the glass strip 15. This lug 20 is keyed into a guideway indicated by the dotted lines 22 in the frame member 19 so that it may be reciprocated longitudinally of the frame member and transversely of the glass 15. A screw 23 is associated with a controlling handle 25 and the lug 20 for the purpose of holding the lug 20, and consequently the contact roller 21, in any desired position relative to the frame 19. It will be understood that the object of this adjustable contact arm formed by the lug 20 and the roller 21 is to provide means for controlling the width of the strip of glass formed. This purpose will be somewhat more fully brought out hereinafter. Pivoted at 26 in the frame 19 is a contact arm 27 having a roller 28 at the bottom thereof. The contact arm 27 has a horizontal extension 29 at the upper end thereof which extends along the frame 19 toward one end thereof and which has a counterbalance weight 30 adjustably mounted on the end of the extension 29.

From the construction of the foregoing parts it will be seen that rollers 21 and 28 will bear against the edges of the strip of glass 15 on the conveyor 11 and that variations in the width of the strip 15 will cause a movement of the contact arm 27 and the extension 29 thereon. If it is desired to run a twenty-two inch strip of glass for instance, it will be seen that the adjacent edges of the rollers 21 and 28 may be set, by means of the handle 25, so that they are exactly twenty-two inches apart when the extension 29 is in a horizontal position. The figure 22 is merely given as illustrative and, of course, other widths as desired can be substituted. Variations in the width of the strip passing beneath these rollers will then cause the roller 28 to move horizontally thereby imparting a vertical motion to the outer end of the extension 29. We have connected the extension 29 by means of a lug 31 thereon with the contact box such as is illustrated diagrammatically in Figure 4. In this figure the lug 31 is designed to carry a movable contact member 33 which, by its upward movement, closes a low voltage circuit at 34 thru an electromagnet 35. It will be understood we have illustrated the low voltage circuit as being energized by the battery 36 but that any type of low voltage current is adapted for the purpose. Energizing of the electromagnet 35 draws up an armature 37 which in turn closes contacts at 38 in a high voltage circuit carried by the wires 39 and 40. The feed wires 41 and 42 indicate the wires of the motor 43 which drives the conveyor 11 and the roller 12. This circuit passes thru a field winding 44. The motor 43 is so arranged that when the field windings of the motor are subjected to an increased current then that the re-action of the armature thereto decreases the speed of the motor. On the other hand, a decrease in the field current of the motor increases the speed of the motor.

We provide a rheostat 45 in connection with the feed wire 41 and the field coil 44 which controls the amount of current from the main feed lines supplied to this field coil 44. The circuit from the rheostat 45 normally passes along the wire 46 to the coil 44. In this wire 46 we provide normally closed contact members at 48 and a variable resistance 47. It will, therefore, be seen that the current from the rheostat 45 to the coil 44 normally passes substantially without resistance thru the contacts at 48 to the coil 44 so that the motor's speed is regulated wholly from the rheostat 45.

If, however, the width of the strip 15 should vary, as for instance, by becoming too narrow due to the slight decrease in the amount of glass supplied to the conveyor 11, then the roller 28, or contact arm, would be thrown toward the center of the glass strip by the weight 30 thereby causing the lug 31 to close the contacts at 34, thereby in turn closing the contacts at 38. This in turn closes a shunt circuit around the rheostat 45 to the wires 39 and 40 and a variable resistance 49. As the current entering the feed wire 41 will divide passing thru the resistance 49 and the rheostat 45 inversely in proportion to the resistance, it will be seen that the resistance 49 may be adjusted or varied so that the resistance to the current entering at 41 will be diminished thereby permitting more current to pass thru the wire 46 to the motor field 43, which cuts down the motor speed; cutting down the motor speed cuts down the speed of the conveyor 11 and roller 12 thereby allowing the glass fed thereto to be proportionately increased in amount which in turn results in widening the strip of glass formed on the conveyor 11.

On the other hand, if the glass should become too wide on the conveyor 11 then it would tend to spread the rollers 21 and 28 thereby tending to raise the extension 29 which in turn closes contacts in the low voltage circuit at 50, thereby energizing a coil 51, which in turn actuates an armature 52 to open the contacts at 48. Opening of the contacts at 48 results in causing the entire field circuit thru the wire 46 to pass thru the variable or adjustable resistance 47, so that the current entering the coil 44 may be lessened by the resistance 47 thereby increasing the speed of the motor 43. Increasing the motor's speed in turn increases the speed of the conveyor 11 and roller 12 thereby carrying away the glass faster in proportion to its rate of supply, which in turn causes the strip of glass 15 to become narrower.

It will, therefore, be seen that we have provided a width regulator for a machine for continuously forming glass with certain definite advantages and functions which enable the regulator to exactly control the width of glass and which enable the regulator to be set so that glass of different widths may be run. For instance, glass of varying widths may be run by simply varying the position of the roller 21 relative to the roller 18. Variations in the width of the strip passing between these rollers 21 and 28, however, moves the roller 28 to either speed up or slow down the conveyor to thereby make the glass strip thereon narrower or wider.

Among the many advantages resulting from the use of our improved regulator, the outstanding result thereof is that we are enabled to manufacture a strip of glass of uniform width thereby saving not only the labor and breakage due to trimming but also saving the material wasted by such trimming. Minor advantages resulting from the use of our improved regulator are very numerous but it may be specifically pointed out that variations in the position of the glass on the conveyor will not effect the operation of the regulator as it is arranged to move laterally with the glass strip automatically. Means are also provided for readily setting the regulator to cause the glass strip to be of any desired width within the limits of the conveyor. Sensitive controlling means, which are long-lived due to the fact that a low voltage is used on the primary contacts and which is not likely to get out of order, are used. The device itself is light and compact and accomplishes all that could be accomplished by any other method of regulation that has been suggested to us or occurred to us, and is very much simpler and cheaper than a regulator associated, for instance, with the control of the flow of the glass.

Some changes may be made in the arrangement and construction of the various parts of our improved device without departing from the spirit of the invention therein and it is our intention to cover by our claims such changes as may be reasonably included within the scope thereof.

We claim as our invention:

1. In a width regulator for strip glass forming machines having a moving member carrying the glass to be formed, strip forming means associated therewith, and actuating devices for said means, members actuated by variations in the width of the formed strip, and means operatively connecting said members to said driving means to automatically vary the speed of the latter proportionally to variations in the width of the glass strip.

2. In a glass strip forming machine, a width regulator having a moving platform and forming devices associated therewith, a frame mounted adjacent to said platform, means mounted on said frame to co-act with the strip formed on the platform and to be actuated by variations in the width of said strip, and means operatively connecting the last described means with the moving platform to vary the platform speed proportionally to the width of the glass strip.

3. In a glass strip forming machine, a width regulator having a moving platform and forming devices associated therewith, a frame mounted adjacent to said platform, means mounted on said frame to co-act with the strip formed on the platform and to be actuated by variations in the width of said strip, said frame being movable transversely relative to the platform whereby the frame may be moved to a pre-determined position relative to the glass strip, and means operatively connecting the last described means with the moving platform to vary the platform speed proportionally to the width of the glass strip.

4. In a width regulator for glass strip forming machines having a moving platform, a frame member adjustably mounted thereon and a second member movably mounted thereon whereby the adjustable member may be set to regulate the width of the strip formed on said platform, and the second member may be moved by variations in the width of the strip to automatically regulate the speed of the platform.

5. In a glass width regulator for glass strip forming machinery having a moving platform with strip forming members associated therewith, a frame adapted to be moved transversely of the line of movement of the platform by a strip formed on the platform, an adjustable stop on said frame and a movable stop on said frame whereby the strip passing between the stops may cause the frame to vary its position relative to the platform, the adjustable stop may determine the width of the strip formed on the platform, and the movable stop may be actuated by variations in the width of the strip to vary the speed of the platform.

6. In a width regulator for glass strip forming machines having a source of supply from which the glass flows continuously and a strip forming mechanism adapted to reduce the flow of glass to a pre-determined thickness, means actuated by variations in the width of the formed strip for varying the speed of the strip forming mechanism in proportion to variations in the width of the formed strip.

Dated Jan. 24, 1922.

CLARENCE W. AVERY.
WENZEL G. VESEY.